United States Patent
Kim et al.

(10) Patent No.: US 9,197,770 B2
(45) Date of Patent: Nov. 24, 2015

(54) METHOD AND APPARATUS FOR PERFORMING IMAGE FORMING JOB, AND RECORDING MEDIUM

(71) Applicant: SAMSUNG ELECTRONICS CO., LTD., Suwon-si, Gyeonggi-do (KR)

(72) Inventors: Young-jin Kim, Pocheon-si (KR); An-na Park, Suwon-si (KR); Da-hye Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/523,010

(22) Filed: Oct. 24, 2014

(65) Prior Publication Data

US 2015/0116795 A1    Apr. 30, 2015

(30) Foreign Application Priority Data

Oct. 24, 2013   (KR) ...................... 10-2013-0127299

(51) Int. Cl.
| | | |
|---|---|---|
| *H04N 1/04* | (2006.01) | |
| *H04N 1/00* | (2006.01) | |
| *H04N 1/10* | (2006.01) | |
| *H04N 1/028* | (2006.01) | |

(52) U.S. Cl.
CPC ......... *H04N 1/0044* (2013.01); *H04N 1/00392* (2013.01); *H04N 1/00551* (2013.01); *H04N 1/02895* (2013.01); *H04N 1/1039* (2013.01); *H04N 2201/0081* (2013.01); *H04N 2201/0094* (2013.01); *H04N 2201/043* (2013.01)

(58) Field of Classification Search
CPC ............... H04N 2201/0418; H04N 1/1017; H04N 2201/0422; H04N 1/00551; H04N 1/00795; H04N 1/00724; H04N 1/00779; H04N 2201/0081; H04N 2201/0414; G03F 7/002; G03F 7/2014; G03F 7/2022; G02F 1/1334
USPC .......... 358/474, 487, 475, 509, 488, 497, 1.9, 358/449; 355/75, 118, 129, 61, 74, 77; 399/305, 341, 370, 376, 377, 378, 379, 399/380
See application file for complete search history.

(56) References Cited

U.S. PATENT DOCUMENTS

| | | | | |
|---|---|---|---|---|
| 5,278,128 | A * | 1/1994 | Hotta et al. | 503/207 |
| 5,880,445 | A * | 3/1999 | Mori et al. | 235/380 |
| 5,948,727 | A * | 9/1999 | Hotta et al. | 503/200 |
| 5,991,055 | A * | 11/1999 | Haselby et al. | 358/509 |
| 6,377,339 | B1 * | 4/2002 | Westerman et al. | 355/75 |
| 7,154,170 | B2 * | 12/2006 | Boyd | 257/679 |
| 7,772,765 | B2 * | 8/2010 | Park et al. | 313/506 |
| 7,907,311 | B2 * | 3/2011 | Roberts et al. | 358/487 |
| 8,014,044 | B2 * | 9/2011 | Shiga et al. | 358/488 |
| 8,130,423 | B2 * | 3/2012 | Nakano et al. | 358/474 |
| 8,547,603 | B2 * | 10/2013 | Shilling | 358/474 |
| 8,964,277 | B2 * | 2/2015 | Huang et al. | 359/265 |
| 2010/0149834 | A1 * | 6/2010 | Kim et al. | 362/612 |
| 2013/0033556 | A1 | 2/2013 | Bouverie et al. | |

* cited by examiner

*Primary Examiner* — Negussie Worku
(74) *Attorney, Agent, or Firm* — Staas & Halsey LLP (57) ABSTRACT

A method and apparatus for performing an image forming job by maintaining a cover, which covers a scan area and has adjustable transparency, in a transparent state until a job for acquiring image data of a scan object starts in an image forming apparatus. If the job for acquiring the image data of the scan object positioned in the scan area starts, the image forming apparatus converts the cover into an opaque state and acquires the image data of the scan object. If the job for acquiring the image data of the scan object is ended, the image forming apparatus reconverts the cover into a transparent state. Therefore, efficiency of a job for acquiring image data of a scan object is improved.

19 Claims, 6 Drawing Sheets

METHOD AND APPARATUS FOR PERFORMING IMAGE FORMING JOB, AND RECORDING MEDIUM

CROSS-REFERENCE TO RELATED APPLICATIONS

This application claims the benefit of Korean Patent Application No. 10-2013-0127299, filed on Oct. 24, 2013, in the Korean Intellectual Property Office, the disclosure of which is incorporated herein in its entirety by reference.

BACKGROUND

1. Field

One or more embodiments of the present disclosure relate to a method and apparatus for performing an image forming job, and a recording medium.

2. Description of the Related Art

A multifunctional peripheral (MFP) that is mainly used in an office generally supports a scan function, a printing function, a faxing function, etc. Therefore, a document may be scanned by using the MFP to acquire image data.

The MFP may acquire the image data by using reflection information of light that is irradiated from a light source of the MFP onto the document. Here, a cover that covers a scan area of the MFP blocks out the light irradiated onto the document so that the light does not go out.

If a user places the document in the scan area of the MFP and closes the cover, the user may not check a state of the document before a scan job is performed. Therefore, it is difficult to adjust a position and a shape of the document before the image data is acquired.

SUMMARY

One or more embodiments of the present disclosure include a method and apparatus for improving efficiency of a job for adjusting transparency of a cover covering a scan area of an image forming apparatus to acquire image data of an object positioned in the scan area.

Additional aspects will be set forth in part in the description which follows and, in part, will be apparent from the description, or may be learned by practice of the presented embodiments.

According to one or more embodiments of the present disclosure, a method of performing an image forming job, includes: maintaining a cover, which covers a scan area and has adjustable transparency, in a transparent state until a job for acquiring image data of a scan object starts in an image forming apparatus; if the job for acquiring the image data of the scan object positioned in the scan area starts, converting the cover into an opaque state; acquiring the image data of the scan object; and if the job for acquiring the image data of the scan object is ended, reconverting the cover into a transparent state.

The converting of the cover into the opaque state may include: if a job request signal for requesting the job for acquiring the image data of the scan object is acquired, converting the cover into the opaque state.

The converting of the cover into the opaque state may include: applying a preset voltage to the cover.

The cover may have a display function. The method may further include displaying the acquired image data on the cover.

The method may further include: if a plurality of pieces of image data are acquired, displaying the plurality of pieces of image data on the cover.

The method may further include: receiving editing information about the plurality of pieces of image data from a user; and applying the editing information to the plurality of pieces of image data. The editing information may be received from the user by using a touch method.

The acquiring of the image data may include: compensating for a color temperature of the acquired image data based on a color of the opaque cover.

The acquiring of the image data of the scan object may include: measuring transparency of the cover based on transmittance of light that is incident from a light source of the image forming apparatus into the cover; and acquiring the image data of the scan object based on the measured transparency.

The acquiring of the image data of the scan object may include: if the measured transparency is included in a preset range, acquiring the image data of the scan object.

According to one or more embodiments of the present disclosure, an apparatus for performing an image forming job, includes: a cover which covers a scan area of an image forming apparatus; a controller which maintains the cover having adjustable transparency into a transparent state until a job for acquiring image data of a scan object starts and, if the job for acquiring the image data of the scan object positioned in the scan area starts, converts the cover into an opaque state; and an image data acquirer which acquires the image data of the scan object. If the job for acquiring the image data of the scan object is ended, the controller may reconvert the cover into a transparent state.

If a job request signal for requesting the job for acquiring the image data of the scan object is acquired, the controller may convert the cover into the opaque state.

The controller may apply a preset voltage to the cover to adjust transparency of the cover.

The cover may have a display function to display the acquired image data.

If a plurality of pieces of image data are acquired, the cover may display the plurality of pieces of image data.

The image data acquirer may receive editing information about the plurality of pieces of image data from a user to apply the editing information to the plurality of pieces of image data. The editing information may be received from the user by using a touch method.

The image data acquirer may compensate for a color temperature of the acquired image data based on a color of the opaque cover.

The image data acquirer may measure transparency of the cover based on transmittance of light that is incident from a light source of the image forming apparatus onto the cover and acquire the image data of the scan object based on the measured transparency.

If the measured transparency is included in a preset range, the image data acquirer may acquire the image data of the scan object.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element, such as a layer, a region, or a substrate, is referred to as being "on," "connected to" or "coupled to" another element, it may be directly on, electrically connected or coupled to the other element or intervening elements may be present. In contrast, when an element is referred to as being "directly on," "directly connected to" or "directly coupled to" another element or layer, there are no intervening elements or layers present. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The present disclosure will now be described in detail with reference to the attached drawings.

Figure 1:
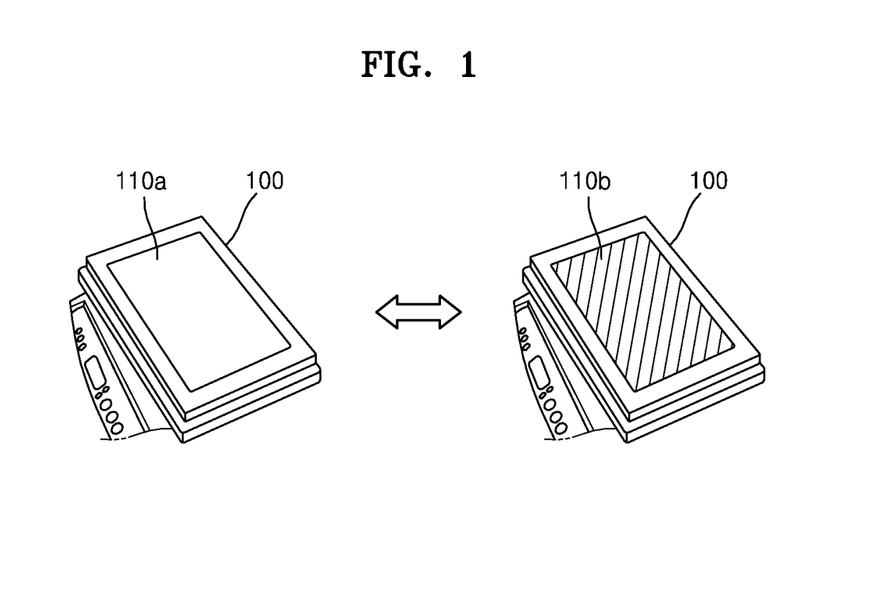
FIG. 1 is a view illustrating an image forming apparatus according to an embodiment of the present disclosure.

FIG. 1 is a view illustrating an image forming apparatus 100 according to an embodiment of the present disclosure.

As described above, the image forming apparatus 100 may correspond to a multifunctional peripheral (MFP) that may perform coping, printing, scanning, faxing, e-mailing functions, etc. For convenience of description, the image forming apparatus 100 will be described as an MFP, but the present embodiment is not limited thereto.

The image forming apparatus 100 may acquire image data of a scan object by using reflection information of light that is acquired by irradiating the light onto the scan object placed in a scan area. Here, the image forming apparatus 100 may cover the scan area with covers 110a and 110b to prevent the irradiated light from escaping.

The image forming apparatus 100 according to the present embodiment may adjust transparencies of the covers 110a and 110b that cover the scan area. For example, the image forming apparatus 100 may apply a voltage to the covers 110a and 110b to convert the covers 110a and 110b in a transparent or opaque state. FIG. 1 illustrates the transparent cover 110a and the opaque cover 110b into which the covers 110 and 110b are converted according to a result of applying the voltage to the covers 110a and 110b by using the image forming apparatus 100. For convenience of description, the transparent cover 110a and the opaque cover 110b will be referred to as a cover 110.

The cover 110 that covers the scan area of the image forming apparatus 100 may be formed of a material of which optical characteristic (for example, transparency) is changed according to changes in a size of a voltage applied to cholesteric liquid crystal display (LCD) and photonic crystal materials.

The image forming apparatus 100 according to the present embodiment may adjust transparency of the cover 110 to convert the cover 110 into an opaque or transparent state in each of processes of a scan job for acquiring image data.

The image forming apparatus 100 according to the present embodiment may display the acquired image data on the cover 110. A method of displaying image data acquired by the image forming apparatus 100 on a cover will be described in detail later with reference to FIG. 4.

Figure 2:
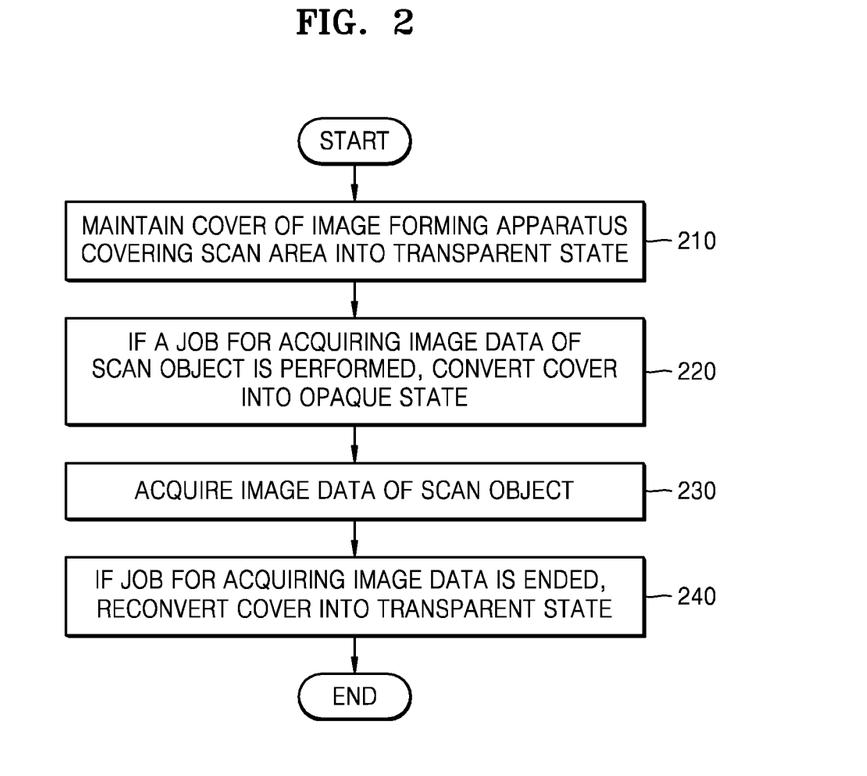
FIG. 2 is a flowchart illustrating a method of controlling an image forming apparatus, according to an embodiment of the present disclosure.

FIG. 2 is a flowchart illustrating a method of controlling the image forming apparatus 100, according to an embodiment of the present disclosure.

In operation 210, the image forming apparatus 100 maintains the cover 110 covering a scan area in a transparent state until a job for acquiring image data of a scan object starts. A film type reflective display having adjustable transparency may be used as the cover 110 of the image forming apparatus 100 according to the present embodiment. Here, the transparency may be adjusted based on a size of a voltage applied to the cover 110. For example, if a reflective display is generated by using cholesteric LCD or photonic crystal material, a voltage between a predetermined voltage range (e.g., approximately approximately 40V and 60V) may be generally applied to convert transparency of the reflective display. The reflective display using the cholesteric LCD or photonic crystal material may be converted into a transparency state at a voltage lower than or equal to a predetermined first voltage (e.g., approximately approximately 45V) and into an opaque state at a voltage higher than or equal to a predetermined second voltage (e.g., approximately 55V).

Accordingly, if the reflective display is generated using the cholesteric LCD or photonic crystal material according to the above example voltages, the image forming apparatus 100 may apply a voltage higher than or equal to the predetermined minimum voltage (e.g., approximately 40V) and lower than or equal to the predetermined first voltage (e.g., approximately 45V) to the cover 110 covering the scan area to maintain the cover 110 in the transparent state.

However, this is only an embodiment, and thus the present disclosure is not limited thereto. In other words, besides the cholesteric LCD or photonic crystal material, any material having adjustable transparency may be used to generate the cover 110 of the image forming apparatus 100. A size of a voltage applied to the cover 110 may be set by a user based on transparency of the cover 110 that is determined according to a voltage applied to a material forming the cover 110.

The user may easily check a state of the scan object that is covered with the cover 110. When the user covers the scan object with the cover 110, the scan object gets out of a preset position or a shape of the scan object may be unintentionally changed. In this case, the user may check the state of the scan object through the cover 110 before inputting a command to acquire the image data of the scan object into the image forming apparatus 100.

For example, if the scan object is folded when the user covers the cover, the user may adjust the scan object covered with the cover 110. The user may check whether the scan object covered with the cover 110 exists in intentioned position and shape and then execute a scan job.

If the user starts a job for acquiring the image data of the scan object positioned in the scan area, the image forming apparatus 100 opaquely converts the cover 110 having adjustable transparency in operation 220.

The image forming apparatus 100 may irradiate the light onto the scan object positioned in the scan area to perform the scan job in order to obtain the image data. The state of the cover 110 may be opaque to prevent the light irradiated onto the scan object by the image forming apparatus 100 from escaping. If the cover 110 maintains a transparent state, the irradiated light may penetrate the cover 110, and it may be difficult to effectively prevent the light from escaping.

If the scan job starts, the image forming apparatus 100 according to the present embodiment may opaquely convert the cover 110 to effectively prevent the light from escaping. For example, the image forming apparatus 100 may apply a voltage higher than or equal to the predetermined second voltage (e.g., approximately 55V) and lower than or equal to a predetermined maximum voltage (e.g., approximately 60) to the cover 110 to opaquely convert in order to effectively prevent the light from escaping.

If the image forming apparatus 100 receives a signal for requesting acquiring of the image data of the scan object, the image forming apparatus 100 may start the scan job with respect to the scan object. For example, if the user presses a job performing button attached to the image forming apparatus 100, the signal for requesting acquiring of the image data may be transmitted to the image forming apparatus 100. If the image forming apparatus 100 receives the signal for requesting the acquiring of the image data, the image forming apparatus 100 may apply a preset voltage to the cover 110 to opaquely convert the cover 110.

In operation 230, the image forming apparatus acquires the image data of the scan object.

If the cover 110 is opaquely converted, the image forming apparatus 100 according to the present embodiment may acquire the image data of the scan object. The image forming apparatus 100 may check whether the cover 110 is opaquely converted. The image forming apparatus 100 may also perform a job for acquiring the image data based on the check result. This will be described in more detail later with reference to FIG. 3.

If the job for acquiring the image data of the scan object is ended, the image forming apparatus 100 reconverts the cover 110 into the transparent state in operation 240.

If the job for acquiring the image data is ended, the image forming apparatus 100 according to the present embodiment may apply a voltage higher than or equal to a predetermined minimum voltage (e.g., approximately 40V) and lower than or equal to a predetermined first voltage (e.g., approximately 45V) to opaquely reconvert the cover 110.

If the cover 110 exists in an opaque state after the job for acquiring the image data is ended, it may be difficult for the user to recognize the scan object. For example, if the user performs a scan job for acquiring image data of an identification (ID) card, the user may not recognize the ID card covered with the cover 110 and thus may not take the ID card back even after the job is ended.

If the job for acquiring the image data is ended, the image forming apparatus 100 according to the present embodiment may reconvert the cover 110 into the transparent state so that the user easily recognizes the scan object covered with the cover 110.

Figure 3:
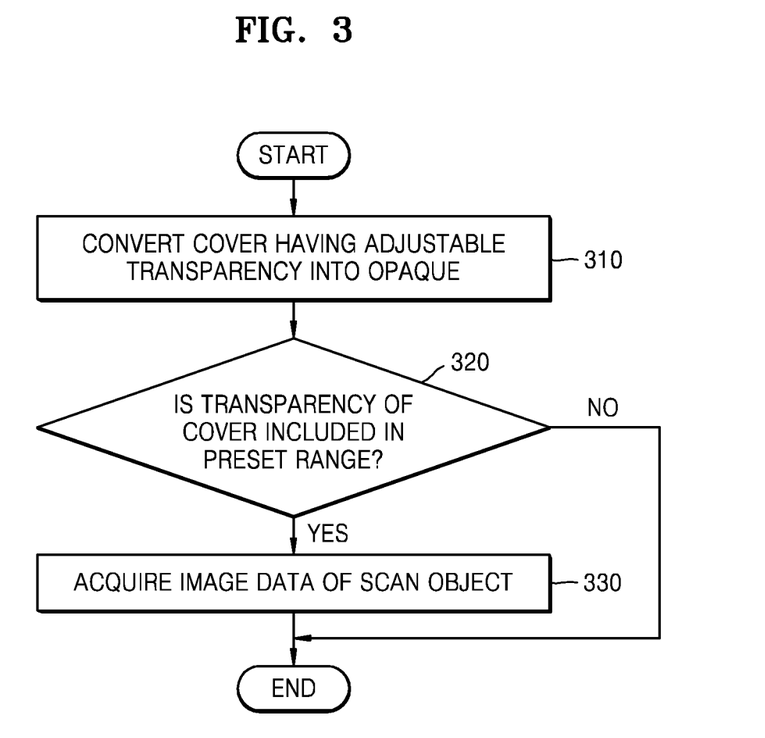
FIG. 3 is a flowchart illustrating a method of acquiring image data based on a result of checking transparency of a cover by using an image forming apparatus, according to an embodiment of the present disclosure.

FIG. 3 is a flowchart illustrating a method of acquiring image data based on a result of checking transparency of the cover 110 by using the image forming apparatus 100, according to an embodiment of the present disclosure.

If a job for acquiring image data of a scan object positioned in a scan area starts, the image forming apparatus 100 may convert the cover 110 having adjustable transparency to opaque in operation 310.

For example, if the image forming apparatus 100 receives a signal for requesting acquiring of the image data of the scan object from a user, the image forming apparatus 100 may apply a preset voltage to the cover 110 to convert a state of the cover 110 into an opaque state.

In operation 320, the image forming apparatus 100 determines whether the converted transparency of the cover 110 is included in a preset range.

The image forming apparatus 100 according to the present embodiment may check whether the cover 110 is opaque enough to prevent light irradiated from the image forming apparatus 100. For example, the image forming apparatus 100 may measure transparency of the cover 110 based on transmittance of the light irradiated from a light source of the image forming apparatus 100 onto the cover 110.

Here, the preset range may be set to a range of an applied voltage appropriate for blocking out the light irradiated from the image forming apparatus 100 according to a result of repeatedly testing the cover 110 of the image forming apparatus 100.

If the transparent of the cover 110 is included in the preset range, the image forming apparatus 100 acquires image data of a scan object in operation 330.

If the transparency of the cover 110 is included in the preset range, the image forming apparatus 100 according to the present embodiment may start a job for irradiating light onto the scan object.

If the transparency of the cover 110 is not included in the preset range, the image forming apparatus 100 may provide information about this to the user. For example, the image forming apparatus 100 may transmit information about the transparency of the cover 110 not being included in the preset range, to an additional user interface (not shown) of the image forming apparatus 100 to provide the information to the user. According to an embodiment, the image forming apparatus 100 may display the information about the transparency of the cover 110 not being included in the preset range, on the cover 110.

According to an embodiment, if the converted transparency of the cover 110 is not included in the preset range, the image forming apparatus 100 may re-apply a preset voltage. According to an embodiment, the image forming apparatus 100 may re-apply a preset voltage or another range of voltage to the cover 110. The method of converting the transparency of the cover 110 by using the image forming apparatus 100 according to the present embodiment is not limited to the above-mentioned example.

The image forming apparatus 100 according to the present embodiment may store information about a standard light source to adjust a color temperature of acquired image data.

The image forming apparatus 100 may compare the stored information about the standard light source with a color temperature value of the acquired image data to compensate for the color temperature of the acquired image data.

According to another embodiment, the image forming apparatus 100 may adjust the color temperature based on a color of the cover 110 that is converted into an opaque state. For example, the image forming apparatus 100 may apply a voltage for converting the cover 110 into a white color to the cover 110. Here, the cover 110 may be formed of cholesteric LCD or photonic crystal material, and a preset voltage may be applied to the cover 110 to adjust the color of the cover 110. The image forming apparatus may convert the color of the cover 110 into a white color to determine the white color of the cover 110 as a criterion for adjusting white balance.

Figure 4:
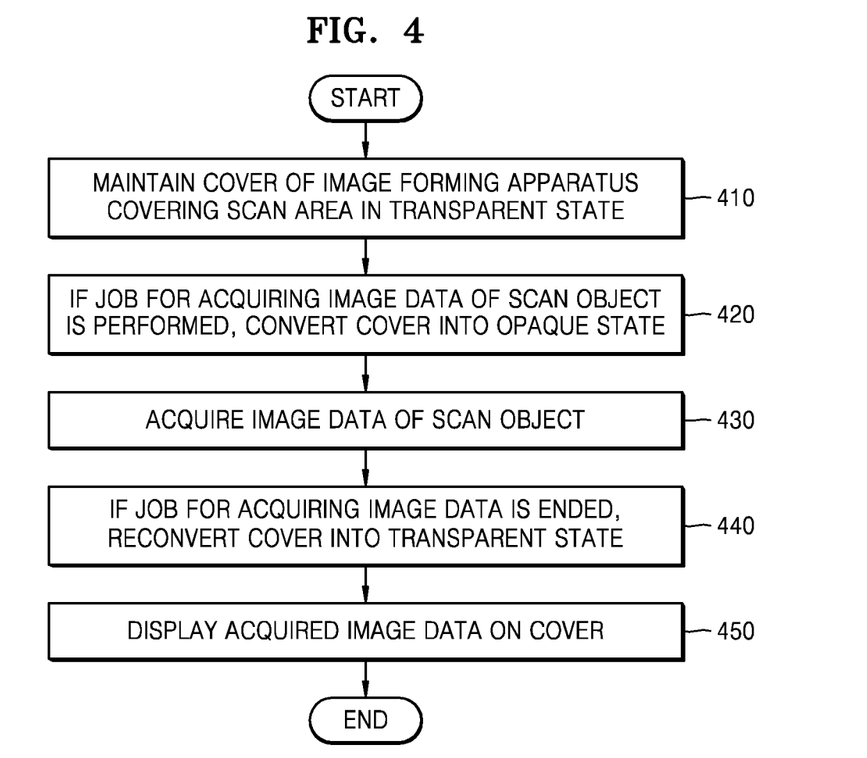
FIG. 4 is a flowchart illustrating a method of displaying acquired image data on a cover having adjustable transparency by using an image forming apparatus, according to an embodiment of the present disclosure.

FIG. 4 is a flowchart illustrating a method of displaying acquired image data on the cover 110 having adjustable transparency by using the image forming apparatus 100, according to an embodiment of the present disclosure.

In operation 410, the image forming apparatus 100 maintains the cover 110 covering a scan area in a transparent state until a job for acquiring image data of a scan object starts.

If the job for acquiring the image data of the scan object positioned in the scan area starts, the image forming apparatus 100 converts the cover 110 having adjustable transparency into an opaque state in operation 420.

In operation 430, the image forming apparatus 100 acquires the image data of the scan object.

If the job for acquiring image data of the scan object is ended, the image forming apparatus 100 reconverts the cover 110 into a transparent state in operation 440.

Operations 410 through 440 described above may respectively correspond to operations 210 through 240 of FIG. 2.

In operation 450, the image forming apparatus 100 displays the acquired image data on the cover 110.

The image forming apparatus 100 according to the present embodiment may display the acquired image data on the cover 110 that is reconverted into the transparent state. The user may intuitively check the image data displayed on the cover 110 that is converted into the transparent state.

The image forming apparatus 100 may display the image data in the same size as a size of the scan object in an area in which the scan object is positioned. The user may check the image data acquired as a result of performing the scan job immediately after the scan job is ended. Therefore, after the scan job is ended, a job for printing the image data or a job for transmitting the image data to an external device may be efficiently performed in the image forming apparatus 100.

The cover 110 of the image forming apparatus 100 may include a touch sensor. The user may adjust a position, a size, a color, etc. of the image data displayed on the cover 110 through a touch input.

In the present specification, the touch input refers to a gesture or the like that is made with respect to the cover 110 to edit the image data by the user.

The user may enlarge or reduce the image data in a desired size through an operation of touching the cover 110 with two fingers and moving the two fingers in different directions. The user may also drag the image data to move the image data in a desired position of the cover 110 in order to easily perform a job for editing the image data. A method of editing image data according to an embodiment of the present disclosure will now be described in detail with reference to FIG. 5.

Figure 5:
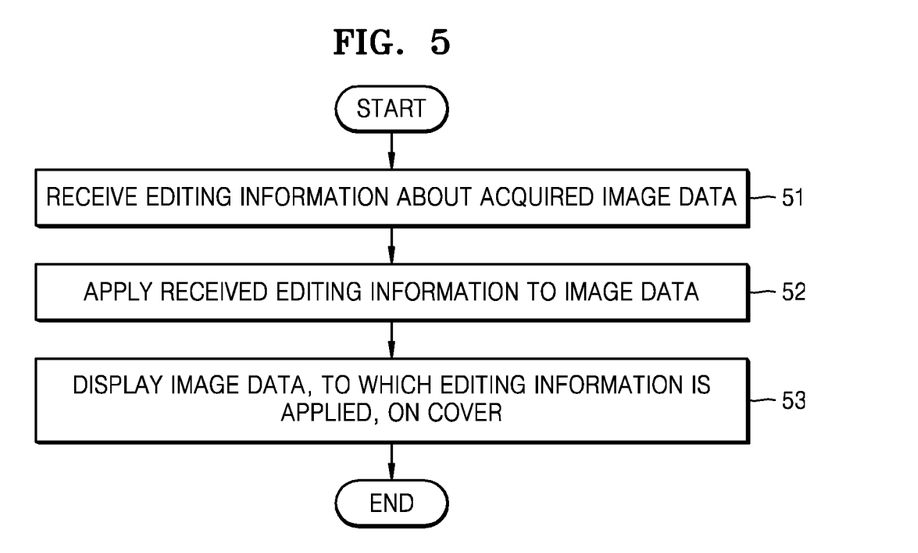
FIG. 5 is a flowchart illustrating a method of editing image data displayed on a cover by using an image forming apparatus, according to an embodiment of the present disclosure.

FIG. 5 is a flowchart illustrating a method of editing image data displayed on the cover 110 by using the image forming apparatus 100, according to an embodiment of the present disclosure.

In operation 510, the image forming apparatus 100 receives editing information about acquired image data from a user. The user may transmit the editing information about the acquired image data to the image forming apparatus 100 through a touch input. For example, the user may touch the image data displayed on the cover 110 by using a finger or a touch unit to transmit the editing information to the image forming apparatus 100.

Here, the editing information may include editing information for extracting some objects from at least one objects included in the image data, position editing information of the at least one objects, and size editing information of the at least one objects, color editing information of the at least one objects, etc. If a plurality of pieces of image data are stored in the image forming apparatus 100, the user may transmit combination editing information which includes each information of the plurality of pieces of image data to the image forming apparatus 100. However, this is only an embodiment of the present disclosure, and editing information of the present disclosure is not limited thereto.

For example, the user may select an object that the user wants to output from the display image data. Here, the image data may include at least one objects. The user may touch a boundary of an area in which the object is displayed, by using a finger or a touch unit to select the area. The image forming apparatus 100 may print only image data of an object positioned in the selected area or transmit only the image data of the object to an external device.

The image forming apparatus 100 according to the present embodiment may store a plurality of pieces of image data that are generated as a result of performing a plurality of scan jobs. The image forming apparatus 100 overlays the plurality of pieces of image data with the cover 110 to display the overlaid image data based on a display command of the user.

The user may transmit position editing information to the image forming apparatus 100 to change an array of the plurality of pieces of image data. For example, the user may drag and drop the image data into a preset position of the cover 110 to array the image data stored in the image forming apparatus according to size.

The user may also transmit editing information for combining the plurality of pieces of image data stored in the image forming apparatus 100 to the image forming apparatus 100. A method of combining a plurality of pieces of image data by using the image forming apparatus 100 will be described in detail later with reference to FIG. 7.

In operation 520, the image forming apparatus 100 applies the received editing information to the image data.

The image forming apparatus 100 according to the present embodiment may change positions, sizes, colors, etc. of the image data based on the editing information of the image data received through the cover 110. The image forming apparatus 100 may extract an object selected from the at least one objects included in the image data. Here, the extracted object may be stored as image data independent of image data that is acquired through a scan job. The image forming apparatus 100 may combine image data selected from the plurality of pieces of image data stored in the image forming apparatus 100 by the user.

In operation 530, the image forming apparatus 100 displays the image data, to which the editing information is applied, on the cover 110.

The user may intuitively check the image data to which the editing information is applied, to easily perform a printing job, a transmitting job, etc. for the image data. The image forming apparatus 100 according to the present embodiment may simultaneously display unedited image data and edited image data on the cover 110. The user may adjust a position, a size, etc. of an image displayed on the cover 110 through a touch input.

Figure 6:
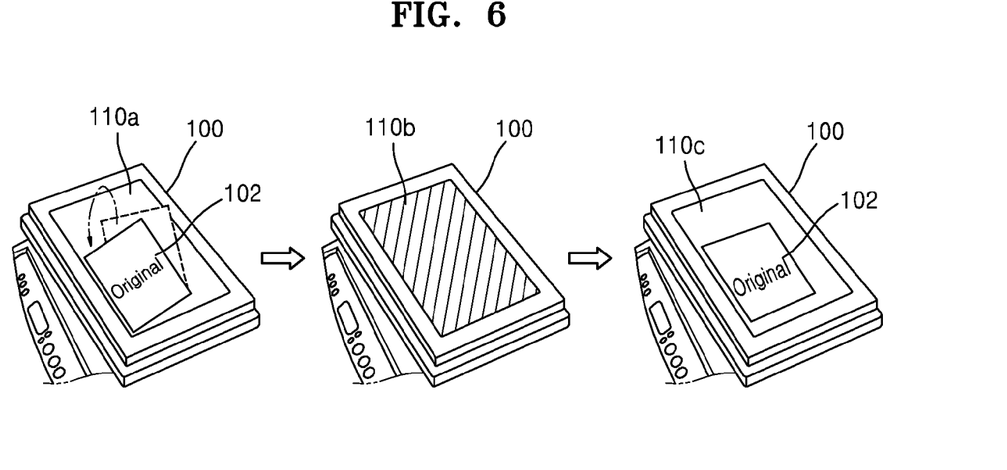
FIG. 6 is a view illustrating a method of adjusting transparency of a cover to acquire image data of a scan object by using an image forming apparatus, according to an embodiment of the present disclosure.

FIG. 6 is a view illustrating a method of adjusting transparency of the cover 110 to acquire image data of a scan object by using the image forming apparatus 100, according to an embodiment of the present disclosure.

The image forming apparatus 100 may maintain the cover 110 covering a scan area in a transparent state until a job for acquiring image data of a scan object starts. For example, if the cover 110 is formed of cholesteric LCD or photonic crystal material, the image forming apparatus 100 may generally apply a voltage between a predetermined voltage range (e.g., approximately 40V and 60V) to the cover 110 to convert transparency of the cover 110.

The image forming apparatus 100 may apply a voltage higher than or equal to a predetermined minimum voltage (e.g., approximately 40V) and lower than or equal to a predetermined first voltage (e.g., approximately 45V) to the cover 110 covering the scan area to maintain the cover 110 in the transparent state. However, this is only an embodiment, and the present disclosure is not limited thereto. In other words, the cover 110 of the image forming apparatus 100 may be formed of a material having adjustable transparency besides the cholesteric LCD or photonic crystal material. A size of a voltage applied to the cover 110 may be set by the user based on a transparency of the cover 110 that is determined according to a voltage applied to a material forming the cover 110.

The user may easily check a state of a scan object 102 that is covered with the cover 110. Referring to FIG. 6, when the user covers the scan object 102 with the cover 110, the scan object 102 may escape from a preset position, and thus desired image data may not be acquired when performing a scan job.

The image forming apparatus 100 according to the present embodiment may maintain the cover 110 in the transparent state so that the user intuitively checks the state of the scan object 102. The user may check and adjust a position of the scan object 102 covered with a transparent cover 110*a* to acquire desired image data.

If a job for acquiring image data of the scan object 102 positioned in a scan area starts, the image forming apparatus 100 may convert the cover 110 having adjustable transparency into an opaque state. For example, the image forming apparatus 100 may apply a voltage higher than or equal to a predetermined second voltage (e.g., approximately 55V) and lower than or equal to a predetermined maximum voltage (e.g., approximately 60V) to the cover 110 formed of cholesteric LCD or photonic crystal material to convert a state of the cover 110 into the opaque state.

An opaque cover 110*b* that is formed as a result of applying a preset voltage by using the image forming apparatus 100 may prevent light irradiated onto the scan object 102 from escaping when performing a scan job.

If the job for acquiring the image data of the scan object 102 is ended, the image forming apparatus 100 according to the present embodiment may reconvert the cover 110 into a transparent state. The user may easily recognize the scan object 102 through a cover 110*c* that is reconverted into a transparent state. For example, if the user performs a scan job for acquiring image data of an ID card, the user may easily recognize the ID card covered with the cover 110*c* reconverted into the transparent state when ending the scan job.

Figure 7:
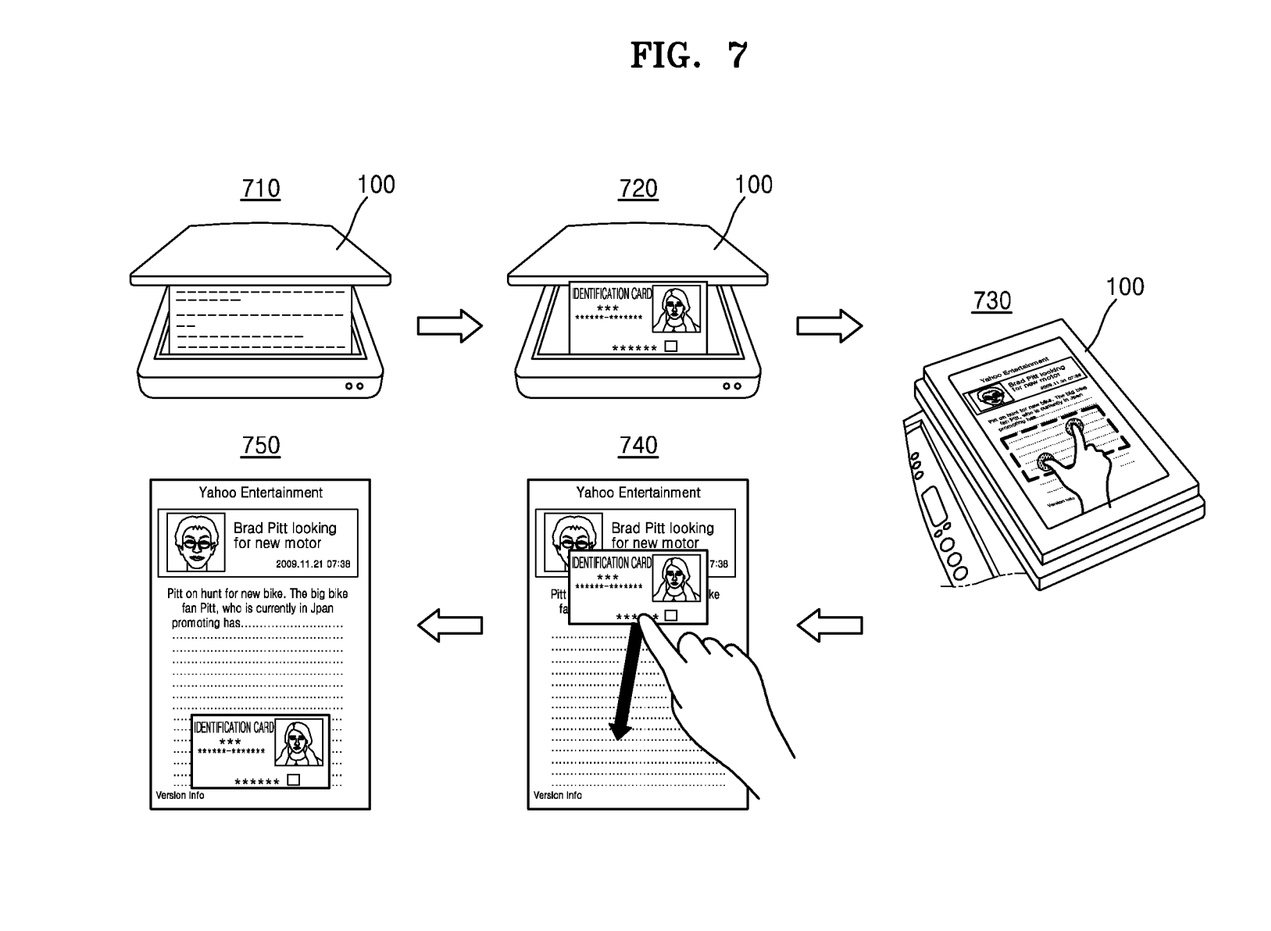
FIG. 7 is a view illustrating a method of receiving editing information of a user to edit a plurality of pieces of image data by using an image forming apparatus, according to an embodiment of the present disclosure.

FIG. 7 is a view illustrating a method of receiving editing information of a user to edit a plurality of pieces of image data by using the image forming apparatus 100, according to an embodiment of the present disclosure.

The image forming apparatus 100 according to the present embodiment may acquire a plurality of pieces of image data through a plurality of scan jobs in a first process 710. The image forming apparatus 100 may acquire image data of a document through a first scan job. Here, the process of acquiring the image data of the document by using the image forming apparatus 100 may be performed by operations 210 through 250 described with reference to FIG. 2. The image forming apparatus 100 may store the acquired image data of the document in a memory (not shown).

The image forming apparatus 100 may acquire image data of an ID card through a second scan job in a second process 720. The process of acquiring the image data of the ID card may also be performed by operations 210 through 240 of FIG. 2. The image forming apparatus 100 may store the acquired image data of the ID card in the memory.

The image forming apparatus 100 may overlay the acquired image data of the document and the image data of the ID card on the cover 110 to display the overlaid image data in a third process 730.

The user may manipulate image data through the use of gestures by touching the cover 110. For example, the user may reduce a size of the image data of the ID card through a pinch operation of touching the cover 110 with two fingers and moving the two fingers in different directions. The user may also select an area, into which the image data of the ID card will be inserted, from the image data of the document displayed on the cover 110 through a touch input. For example, the user may drag a boundary of the area of the image data of the document, into which the image data of the ID card will be inserted, with a finger to provide information about the area to the image forming apparatus 100.

The image forming apparatus 100 may drag the reduced image data of the ID card into a desired position in a fourth process 740. The user may place the reduced image data of the ID card in an area of the image data of the document into which the reduced image data of the ID card will be combined.

The image forming apparatus 100 may combine a plurality of pieces of image data in a fifth process 750. The user may transmit an editing completion signal for informing the image forming apparatus 100 that an editing job of the image data is completed, to the image forming apparatus 100. For example, the user may select an editing completion menu displayed on the cover 110 to transmit the editing completion signal to the image forming apparatus 100. If the image forming apparatus 100 receives the editing completion signal, the image forming apparatus 100 may combine the image data of the document with the image data of the ID card based on editing information received from the user.

The image forming apparatus according to the present embodiment may display an image, which is generated as a result of combining the image data of the document and the image data of the ID card, on the display 110. The image forming apparatus 100 may also perform a job for printing a newly generated image or transmitting the newly generated image to an external device.

Figure 8:
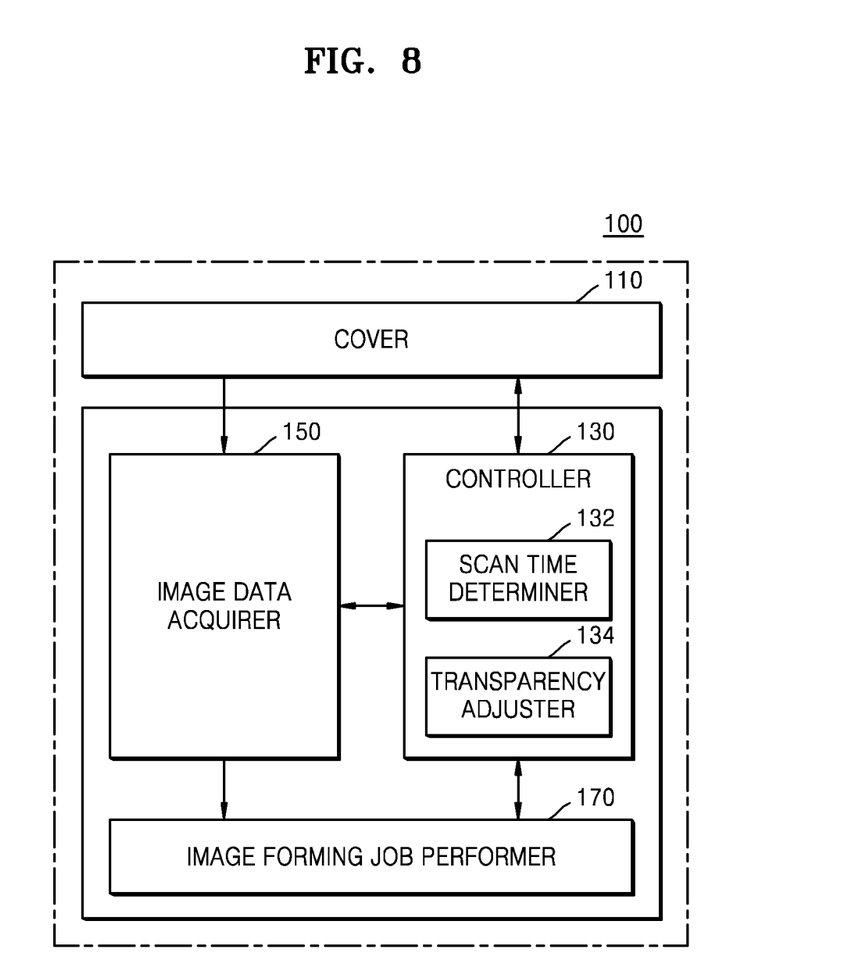
FIG. 8 is a block diagram of an image forming apparatus according to an embodiment of the present disclosure.

FIG. 8 is a block diagram of the image forming apparatus 100, according to an embodiment of the present disclosure.

As shown in FIG. 8, the image forming apparatus 100 according to the present embodiment includes the cover 110, a controller 130, an image data acquirer 150, and image forming job performer 170. However, all of illustrated elements are not indispensable element. The image forming apparatus 100 may be realized by the larger number of elements than the illustrated elements or by the smaller number of elements than the illustrated elements.

The elements will now be described in order.

The cover 110 refers to a unit that covers a scan area of the image forming apparatus 100. Transparency of the cover 110 according to the present embodiment may be adjusted and may be converted when the image forming apparatus 100 performs a scan job.

The cover 110 that covers the scan area of the image forming apparatus 100 may be formed of a material of which optical characteristic (for example, transparency) varies according to a size of an applied voltage such as chelesteric LCD or photonic crystal material or the like.

The cover 110 that is formed of the cholesteric LCD or photonic crystal material may be converted into a transparent state at a voltage lower than or equal to a predetermined first voltage (e.g. 45V) and may be converted into an opaque state at a voltage higher than or equal to a predetermined second voltage (e.g., approximately 55V). However, this is only an embodiment, and the present disclosure is not limited thereto. In other words, the cover 110 of the image forming apparatus 100 may be used of a material having adjustable transparency besides the cholesteric LCD or photonic crystal material. A size of a voltage applied to the cover 110 may be set by the user based on transparency of a material that is determined according to a voltage applied to the material forming the cover 110.

The cover 110 according to the present embodiment may display image data acquired from a scan object. The cover 110 may also receive a touch input from the user. A sensor (not shown) that may recognize the touch input of the user may be positioned inside or outside the cover 110. The sensor will be described later.

The cover 110 according to the present embodiment may receive editing information about the acquired image data from the user. The cover 110 may acquire the editing information through the touch input of the user. Here, the editing information may include at least one of editing information for extracting some objects from at least one object included in the image data, position editing information of the at least one object, size editing information of the at least one object, and color editing information of the at least one object.

If a plurality of pieces of image data are acquired through a plurality of scan jobs, the image forming apparatus 100 according to the present embodiment may display the plurality of pieces of image data on the cover 110. The cover 110 may overlay and display the plurality of image data.

The controller 130 may determine a time when a scan job for acquiring image data is performed to adjust transparency of the cover 110 that covers the scan area. The controller 130 according to the present embodiment may include a scan time determiner 132 and a transparency adjuster 134. The scan time determiner 132 may determine a time when the image data acquirer 150 acquires image data of a scan object positioned in a scan area.

For example, the scan time determiner 132 may determine a time when receiving a job request signal for requesting a job for acquiring image as a time when the job for acquiring the image data starts. According to another embodiment, the scan time determiner 132 may determine a time when the job for acquiring the image data is ended. For example, the scan time determiner 132 may receive a signal for notifying that the time for acquiring the image data is ended from the image data acquirer 150 to check that the job for acquiring the image data is ended.

The transparency adjuster 134 may adjust the transparency of the cover 110 based on the determination result of the scan time determiner 134. For example, if the scan time determiner 134 determines that a scan job for acquiring the image data starts, the transparency adjuster 134 may convert the cover 110 into an opaque state.

The transparency adjuster 134 may apply a preset voltage based on a property of a material forming the cover 110 to convert the cover 110 into the opaque state. A voltage higher than or equal to 40V and lower than or equal to 60V may be applied to a reflective display that is formed of cholesteric LCD or photonic crystal material, to convert transparency of the cholesteric LCD or photonic crystal material. The reflective display that is formed of the cholesteric LCD or photonic crystal material may be converted into an opaque state at a voltage higher than or equal to a predetermined second voltage (e.g., approximately 55V) and lower than or equal to a predetermined maximum voltage (e.g., approximately 60V). If the cover 110 according to the present embodiment is formed as the reflective display formed of the cholesteric LCD or photonic crystal material, the transparency adjuster 134 may apply a voltage higher than or equal to the predetermined second voltage (e.g., approximately 55V) and lower than or equal to the predetermined maximum voltage (e.g., approximately 60V) to the cover 110 in order to convert the cover 110 into the opaque state.

According to another embodiment, if the scan time determiner 134 determines that the scan job for acquiring the image is ended, the transparency adjuster 134 may convert the cover 110 into a transparent state. If the cover 110 is formed as the reflective display formed of the cholesteric LCD or photonic crystal material, the transparency adjuster 134 may apply a voltage higher than or equal to a predetermined minimum voltage (e.g., approximately 40V) and lower than or equal to a predetermined first voltage (e.g., approximately 45V) to reconvert the cover 110 into the transparent state.

The image data acquirer 150 may acquire the image data of the scan object. The image data acquirer 150 may acquire the image data by using reflection information of light irradiated onto the scan object. The light irradiated onto the scan object may be emitted from a light source (not shown) of the image forming apparatus 100.

The image data acquirer 150 may receive editing information about the acquired image data. The image data acquirer 150 according to the present embodiment may receive the editing information that is input from the cover 110 through a touch input of the user. Here, the cover 110 may acquire the touch input of the user by using a touch sensor (not shown) existing in the cover 110. According to another embodiment, the touch sensor may exist outside the cover 110. The image data acquirer 150 may apply the editing information to the acquired image data.

The image data acquirer 150 may acquire a plurality of pieces of image data through a plurality of scan jobs. The image data acquirer 150 may include a memory (not shown) that stores the plurality of pieces of image data. The memory may exist outside the image data acquirer 150.

The image data acquirer 150 according to the present embodiment may measure transparency of the cover 110 based on transmittance of light that is incident from the light source of the image forming apparatus 100 onto the cover 110. The image data acquirer 150 may determine whether to start a job for acquiring image data of the scan object based on the measured transparency. For example, if the measured transparency is included in a preset range, the image data acquirer 150 may start the job for acquiring the image data of the scan object.

The image forming job performer 170 may form an image displayed on the cover 110 based on the image data of the scan object acquired by the image data acquirer 150. If the image data acquirer 150 applies the received editing information received to the image data to form new image data, the image forming job performer 170 may form the image displayed on the cover 110 based on the newly generated image data.

An apparatus according to the present disclosure may include a processor, a memory that stores and executes program data, a permanent storage such as a disk drive, a communication port that communicates with an external apparatus, a user interface such as a touch panel, a key, a button, etc. Methods of embodying a software module or an algorithm may be stored as computer-readable codes or program commands executable on the processor, on a computer-readable recording medium. Examples of the computer-readable recording medium include a magnetic storage medium (for example, read-only memory (ROM), random-access memory (RAM), a floppy disc, a hard disk, etc.) and an optical reading medium (for example, CD-ROMs, digital versatile discs (DVDs), etc.). The computer-readable recording medium may also be distributed over network coupled computer systems so that the computer-readable code is stored and executed in a distributed fashion. The computer-readable recording medium may be read by a computer, stored in a memory, and executed by a processor.

All types of documents including published documents, patent applications, patents, etc. cited in the present disclosure may be integrated herein like cited documents are separately and detailedly integrated or are entirely integrated herein.

For understanding of the present disclosure, reference numerals are shown in the embodiments illustrated in the drawings, and particular terminologies are used to describe the embodiments. However, the present disclosure is not limited by the particular terminologies, and the present disclosure may include all types of elements that may be considered by those of ordinary skill in the art.

The present disclosure may be embodied as functional block structures and various processing operations. These functional blocks may be embodied via various numbers of hardware and/or software structures that execute particular functions. For example, the present disclosure may use direct circuit structures, such as a memory, processing, logic, a look-up table, etc. that may execute various functions through controls of one or more microprocessors or other control apparatuses. Like elements of the present disclosure may be executed as software programming or software elements, the present disclosure may be embodied as a programming or scripting language such as C, C++, assembly language, or the like, including various algorithms that are realized through combinations of data structures, processes, routines, or other programming structures. Functional sides may be embodied as an algorithm that is executed by one or more processors. Also, the present disclosure may use related arts to perform electronic environment setting, signal processing, and/or data processing, etc. Terminology such as a mechanism, an element, a means, or a structure may be widely used and is not limited as mechanical and physical structures. The terminology may also include meanings of a series of routines of software along with a processor, etc.

The particular embodiments described in the present disclosure are just exemplary and do not limit the scope of the present disclosure. For conciseness of the present specification, descriptions of the conventional electronic elements, control systems, software, and other functional sides of the systems have been omitted. Also, connections between lines of elements shown in the drawings or connection members of the lines exemplarily indicate functional connections and/or physical connections or circuit connections. The connections may be replaced or may be indicated as additional various functional connections, physical connections, or circuit connections in a real apparatus. If there is no detailed mention such as "necessary", "important", or the like, the connections may not be elements for making the present disclosure.

The uses of the term "the" and an indicating term similar to the term "the" in the specification of the present disclosure (in particular, in claims) may correspond to both the singular number and the plural number. If a range is described in the present disclosure, individual values belonging to the range are applied to the present disclosure (if there is no description in contrast to this), i.e., the individual values constituting the range are like being described in the detailed description of the present disclosure. If an order of operations constituting a method according to the present disclosure is clearly described or there is no description in contrast to the order, the operations may be performed in any appropriate order. The present disclosure is not necessarily limited to the description order of the operations. The users of all examples or exemplary terms (for example, "etc.") in the present disclosure are simply for describing the present disclosure. Therefore, as the scope of the present disclosure is not limited by the following claims, it is not limited by the examples or the exemplary terms. It will be understood by those of ordinary skill in the art that various modifications, combinations, and changes in form and details may be made according to design conditions and factors therein without departing from the spirit and scope of the present disclosure as defined by the following claims or equivalents thereof.

What is claimed is:

1. A method of performing an image forming job, the method comprising:
   converting a scan area in a cover where a scan object is positioned into an opaque state when a signal for acquiring image data is received in an image forming apparatus;
   acquiring the image data of the scan object; and
   if the image data is acquired, reconverting the cover into a transparent state.

2. The method of claim 1, wherein the converting of the scan area in a cover into the opaque state comprises:
   if a job request signal for requesting the job for acquiring the image data of the scan object is acquired, converting the cover into the opaque state.

3. The method of claim 1, wherein the converting of the scan area in a cover into the opaque state comprises:
   applying a preset voltage to the cover.

4. The method of claim 1, wherein the cover has a display function,
   wherein the method further comprises displaying the acquired image data on the cover.

5. The method of claim 1, further comprising:
   if a plurality of pieces of image data are acquired, displaying the plurality of pieces of image data on the cover.

6. The method of claim 5, further comprising:
   receiving editing information about the plurality of pieces of image data from a user; and
   applying the editing information to the plurality of pieces of image data,
   wherein the editing information is received from the user by using a touch method.

7. The method of claim 1, wherein the acquiring of the image data comprises:
   compensating for a color temperature of the acquired image data based on a color of the opaque cover.

8. The method of claim 1, wherein the acquiring of the image data of the scan object comprises:
  measuring transparency of the cover based on transmittance of light that is incident from a light source of the image forming apparatus into the cover; and
  acquiring the image data of the scan object based on the measured transparency.

9. The method of claim 8, wherein the acquiring of the image data of the scan object comprises:
  if the measured transparency is included in a preset range, acquiring the image data of the scan object.

10. A computer-readable recording medium having recorded thereon a program for executing the method of claim 1 in a computer.

11. An apparatus for performing an image forming job, the apparatus comprising:
  a cover which covers a scan area of an image forming apparatus;
  a controller which converts the scan area in a cover where a scan object is positioned into an opaque state when a signal for acquiring image data is received; and
  an image data acquirer which acquires the image data of the scan object,
  wherein if the image data of the scan object is acquired, the controller reconverts the cover into a transparent state.

12. The apparatus of claim 11, wherein if a job request signal for requesting the job for acquiring the image data of the scan object is acquired, the controller converts the cover into the opaque state.

13. The apparatus of claim 11, wherein the controller applies a preset voltage to the cover to adjust transparency of the cover.

14. The apparatus of claim 11, wherein the cover has a display function to display the acquired image data.

15. The apparatus of claim 11, wherein if a plurality of pieces of image data are acquired, the cover displays the plurality of pieces of image data.

16. The apparatus of claim 15, wherein the image data acquirer receives editing information about the plurality of pieces of image data from a user to apply the editing information to the plurality of pieces of image data,
  wherein the editing information is received from the user by using a touch method.

17. The apparatus of claim 11, wherein the image data acquirer compensates for a color temperature of the acquired image data based on a color of the opaque cover.

18. The apparatus of claim 11, wherein the image data acquirer measures transparency of the cover based on transmittance of light that is incident from a light source of the image forming apparatus onto the cover and acquires the image data of the scan object based on the measured transparency.

19. The apparatus of claim 18, wherein if the measured transparency is included in a preset range, the image data acquirer acquires the image data of the scan object.

\* \* \* \* \*